June 19, 1923.
H. K. KNUTZON
BURIAL VAULT TEMPORARY HANDLE LOCK
Filed Oct. 17, 1922
1,459,219
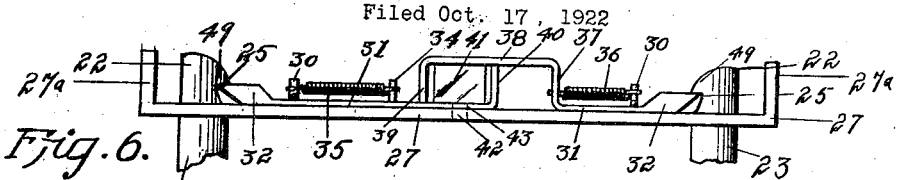
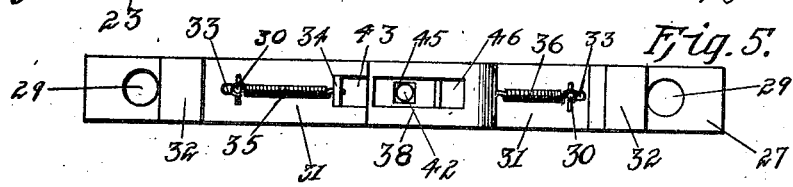
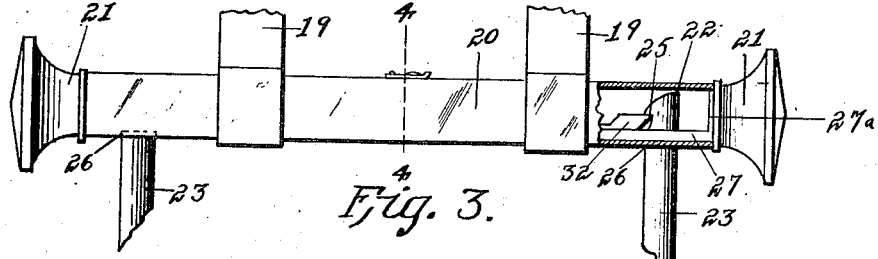
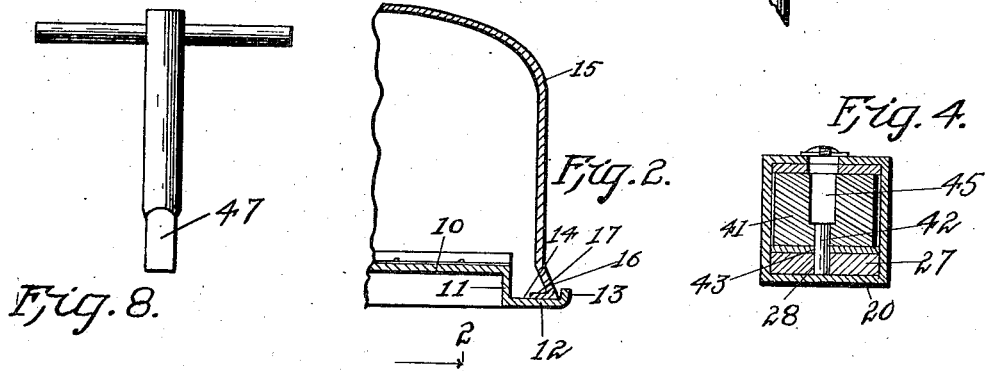
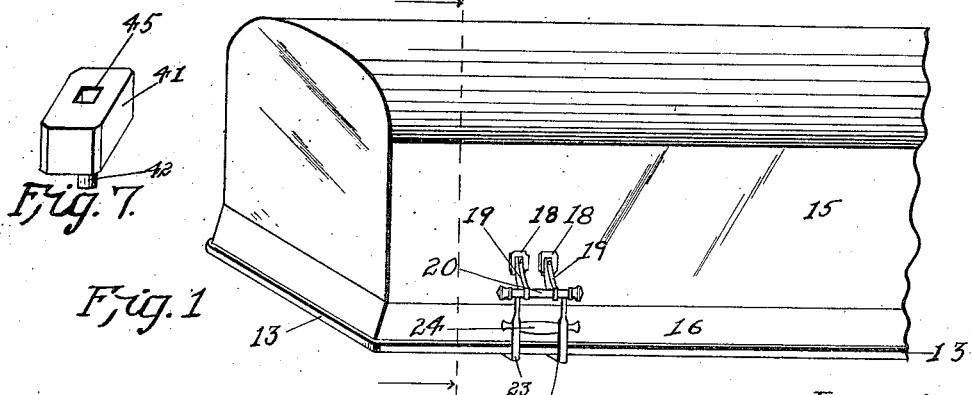
Inventor
Henry K. Knutzon
By Owing & Hague Att'ys Patented June 19, 1923.

1,459,219

UNITED STATES PATENT OFFICE.

HENRY K. KNUTZON, OF THOR, IOWA.

BURIAL-VAULT TEMPORARY-HANDLE LOCK.

Application filed October 17, 1922. Serial No. 595,086.

*To all whom it may concern:*

Be it known that I, HENRY K. KNUTZON, a citizen of the United States, and a resident of Thor, in the county of Humboldt, State of Iowa, have invented a certain new and useful Burial-Vault Temporary-Handle Lock, of which the following is a specification.

This invention relates to improvements in fastening devices such as used on sheet metal burial vaults, and that type of a vault which employs a base member and a detachable cover member, the said members being provided with automatically locking means which will automatically fasten when they are closed, and which when once fastened can not again be reopened. The locking devices for this type of a vault are so arranged that the said locking devices can be made inoperative until such time as it is desired to permanently close the cover member. A considerable difficulty is experienced in shipping and handling the vaults due to the fact that no adequate means has been provided heretofore for temporarily locking the cover and base together. This is especially true when the casket and vault are shipped together from one point to another and it is desired to reopen the vault after the same has reached its destination.

It is, therefore, the object of my invention to provide in connection with this type of vaults, a temporary locking device of simple, durable and inexpensive construction, which may be so arranged that the two members of the vault may be easily and quickly locked together or unlocked at the will of the operator so that the same may be shipped or handled as a unit.

A further object is to provide such a locking mechanism which may be installed in connection with the handle of the cover in such a manner that the lock itself is practically invisible, and so that the said handle may be made a part of the locking mechanism.

A further object is to provide a locking mechanism for the two members of the vault above mentioned, so that the said members may be each provided with a separate handle, and the two handles having means whereby they may be locked together for the purpose of locking the two members together.

These and other objects will be apparent to those skilled in the art.

My invention consists in the construction, arrangement, and combination of the various parts of the device, whereby the objects contemplated are attained, as hereinafter more fully set forth, pointed out in my claims, and illustrated in the accompanying drawings, in which:

Figure 1 is a segmental perspective view of a burial vault of the type above referred to showing the manner in which one of my combined handle and locking devices is applied thereto.

Figure 2 is a transverse, sectional view taken on the line 2—2 of Figure 1.

Figure 3 is an enlarged detail elevation of a segmental portion of the handle member for the cover.

Figure 4 shows a detail, sectional view taken on the line 4—4 of Figure 3.

Figure 5 is a detail view of the locking mechanism which is applied to the inner portion of the handle illustrated in Figure 3.

Figure 6 is a side elevation of Figure 5 showing the manner in which the locking bars of the lower handle member are secured to the upper handle.

Figure 7 is a detail perspective view of the lock operating block.

Figure 8 shows the key used for operating the said block.

I have used the numeral 10 to indicate the base member of the vault, each of its edges and ends being provided with a downwardly extended member 11. The lower edges of the said downwardly extended members being provided with an outwardly extended flange 12, the outer edge of which is provided with an upwardly extended portion 13. This upwardly extended portion 13 forms a sort of an annular groove 14 designed to receive the lower edge of the cover member 15.

The said cover member 15 is provided with a flared portion 16 having an inwardly extended flange portion 17. These parts are of the usual construction and form no part of my present invention any other than to show the manner in which my improved locking device may be applied to a burial vault of the type before described.

Each of the side members of the vault 15 is provided with brackets 18, the said brackets being arranged in pairs comparatively close to each other and at a slight distance above the flared portion 16.

Each of the brackets 18 is provided with a pivoted arm 19 which extends downwardly and outwardly from the outside of the cover. The free ends of the members 19 are designed to receive and carry a horizontally arranged tube 20. This tube 20 is designed to form the handle of preferably a rectangular cross section, as clearly shown in Figure 4. Each end of the tube 20 is provided with an ornamental plug or end portion 21. The member 20 is of a length considerably greater than the spacing of the members 19 so that the handle portion is provided with projecting ends 22. The exact shape of this handle portion and the brackets form no particular part of my invention any other than that the handle should be formed hollow.

The flange 12 of the base 10 is provided with a series of handle carrying bars 23 which are spaced apart a distance slightly greater than the spacing of the members 19, and are so arranged that they will project outwardly and then upwardly to a point vertically below the handle 20. The members 23 are provided with a handle portion 24 which is mounted between them in such a manner that the said handle may be easily grasped for the purpose of carrying the base. The members 24 serve the purpose of providing handles for carrying the base while the members 20 serve the purpose of providing means for carrying the cover independently from the base.

The upper end of each of the members 23 has its inner face provided with a notch 25 for the purpose of receiving the latch members hereinafter referred to.

The bottom of each of the end members 22 is provided with an opening 26 for receiving the upper end of the members 23. These upper ends are locked in the handle member 20 by means of the following mechanism:

I have provided a base plate 27 which is laid on top of the bottom of the handle 20, as clearly shown in Figure 4. The said base plate 27 is provided at its central portion with an opening 28, and at each end with the openings 29 to register with the openings 26, and each end is extended at 27ᵃ to engage the interior of the handle 20.

Near each end of the member 27 I have provided an upwardly extending pin 30. Slidably mounted on each end of the upper face of the bar 27 I have provided a slide plate 31. The outer end of each of the plates 31 is provided with a catch member 32. Each of the members 27 is provided with a slot 33 for receiving the corresponding pins 30.

One of the members 27 is provided with an upwardly extending bar 34 for the purpose of securing one end of the coil spring 35, the opposite end of the spring 35 being secured to the pin 30. The opposite end of the pin 30 is secured to one end of the spring 36 while the opposite end of the spring 36 is secured to an upwardly extending portion 37 of the corresponding member 31. The upper end of the portion 37 is provided with a horizontally extending portion 38, the free end of which is provided with a downwardly extending portion 39. The other member 31 has its inner end extended beneath the lower end of the member 39 and provided with upwardly extending portions 40.

The members 40 and 39 are designed to receive between them a rectangular block 41 having a downwardly extending pin 42 extended through a slot 43 in the member 31 and into the central opening 28 in the member 27.

The upper face of the block 41 is provided with a square key receiving opening 45, as clearly shown in Figure 7. The member 38 is provided with a slot 46 in alinement with the opening 45 in such a manner that a key 47 may be inserted through the slot 46 into the opening 45. The springs 35 and 36 are so arranged that the members 39 and 40 will be yieldingly held toward each other against the block 41.

Thus it will be seen that if the key 37 is inserted in the opening 45 of the block 41 and the same is rotated, the members 32 may be moved toward or from each other.

The members 32 are designed to engage the hook members 49 on the upper end of the rods 23 in such a manner that as the upper ends of the members 23 are moved upwardly, through the openings 26 and 29, the hooks 49 will engage the members 32 and thereby hold the bottom 10 and the cover 15 together, and the two members may be carried in unison by simply taking hold of either of the handle members 20 or 24.

When it is desired to open the vault, the key 47 is simply inserted in the hole 45 as before described, and rotated and permits the base member and the cover to be separated.

Thus it will be seen that I have provided a combined handle and locking mechanism by which the base and cover members may be easily, quickly and temporarily secured together, and which may be separated at the will of the operator.

When it is desired to permanently seal the vault the automatic locking mechanisms may be set into operative relation with each other. The temporary locking mechanism may also be locked, thereby providing a double lock.

I claim as my invention:

1. In combination, a burial vault having a base member and a cover member, a series of handle members for said cover member and a series of handle members for said base member, means for automatically locking the handle members of the cover member and those of the base member together, and means for unlocking said locking means.

2. In combination, a burial vault having a base member and a cover member, a number of handle members for the cover member and a number of handle members for the base member, the handles of the cover member being arranged in alinement with the handles of the base member, a key actuated lock carried by the handles of the cover member, means carried by the handle members of the base member for engaging the locking mechanism of the handle members of the cover when the base member and the cover member are in a closed position, and manually operated means for releasing said locking mechanism.

3. A combined handle and locking mechanism for burial vaults comprising a pair of supporting bars, a tubular handle member, a key actuated locking mechanism within the tubular handle member, a second handle member provided with locking bars, a handle for said locking bars arranged substantially parallel with the first said tubular handle, said locking bars being arranged to engage said locking mechanism in operative relation, and means for releasing the said locking mechanism.

Des Moines, Iowa, September 6, 1922.

HENRY K. KNUTZON.